United States Patent
Herich

Patent Number: 5,979,470
Date of Patent: Nov. 9, 1999

[54] METHOD FOR ON-LINE CLEANING OF SULFUR DEPOSITS

[75] Inventor: Charles Arnold Herich, Vacaville, Calif.

[73] Assignee: Shell Oil Company, Houston, Tex.

[21] Appl. No.: 08/943,668

[22] Filed: Oct. 3, 1997

Related U.S. Application Data

[60] Provisional application No. 60/027,601, Oct. 4, 1996.

[51] Int. Cl.⁶ .............................. B08B 9/02; C01B 17/05
[52] U.S. Cl. .................................. 134/22.13; 134/22.17; 423/576.2; 423/576.6
[58] Field of Search ................................ 423/575, 576.2, 423/576.6; 134/22.13, 22.17; 261/1

[56] References Cited

U.S. PATENT DOCUMENTS

| | | | |
|---|---|---|---|
| 3,975,508 | 8/1976 | Richardson et al. | 423/573 R |
| 4,125,597 | 11/1978 | Fleck | 423/573 R |
| 5,085,709 | 2/1992 | Morris et al. | 134/3 |
| 5,738,834 | 4/1998 | Deberry | 412/177 |

*Primary Examiner*—Gary P. Straub
*Attorney, Agent, or Firm*—Y. Grace Tsang

[57] ABSTRACT

A method for on-line cleaning of sulfur deposits collected in the absorber column in a Stretford-type process by washing the sulfur deposits with hot caustic solutions while $H_2S$ is removed from sour gas in the absorber column.

14 Claims, 1 Drawing Sheet

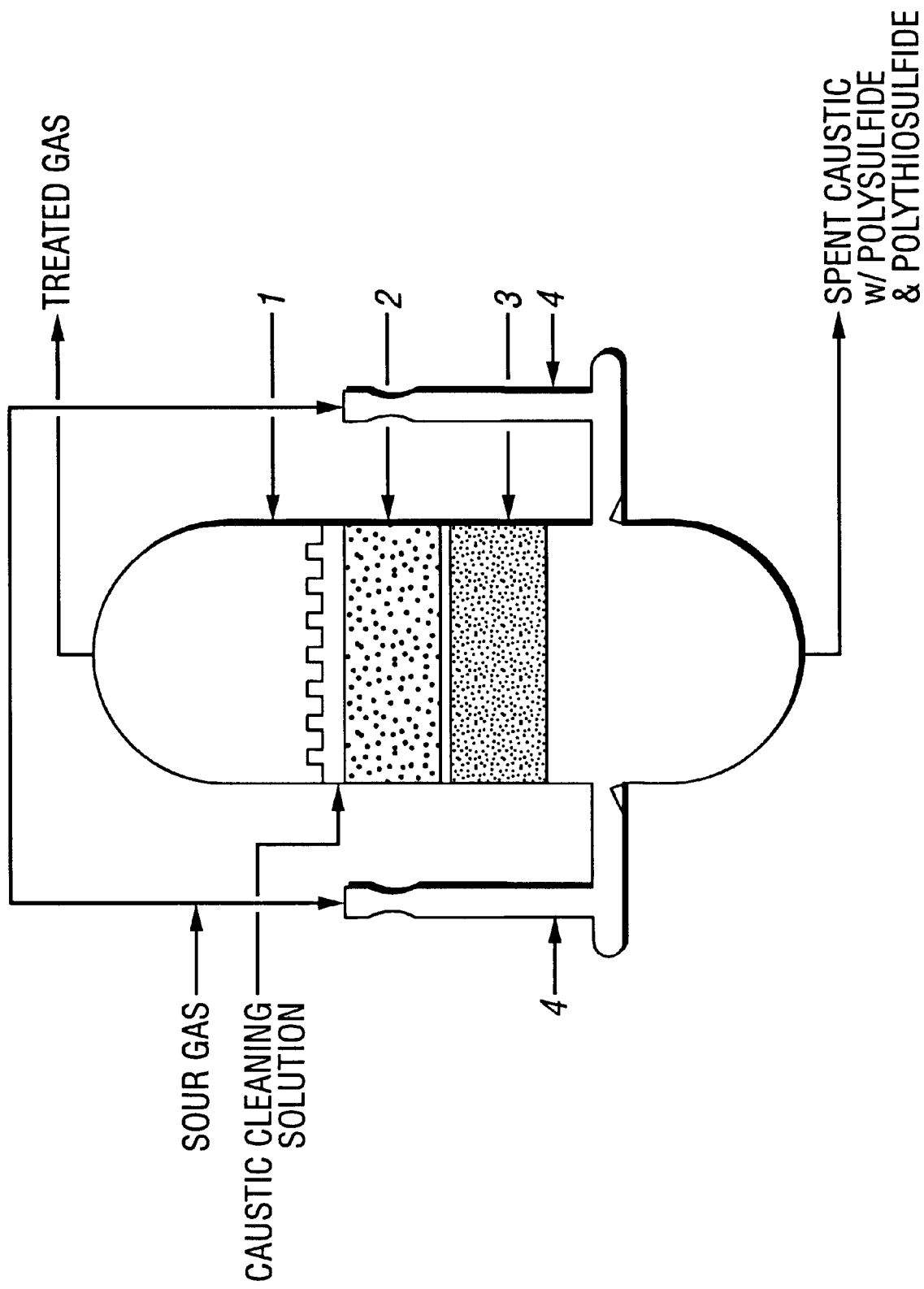

METHOD FOR ON-LINE CLEANING OF SULFUR DEPOSITS

This claims benefit of Provisional Application 60/027,601, filed Oct. 4, 1996.

FIELD OF THE INVENTION

This invention relates to a method for on-line cleaning of sulfur deposits from plant equipment utilized in absorptive-regeneration process for the removal of hydrogen sulfide from sour gas streams in which hydrogen sulfide is converted to elemental sulfur.

BACKGROUND OF THE INVENTION

Petroleum, natural gas and sulfur industry processing plants have for a number of years utilized a variety of processes for removing hydrogen sulfide from sour gas streams. In general, the gas streams are brought into contact with a circulating liquid alkali absorption solution in a contact zone such as an absorber column, and in successive order the $H_2S$ is absorbed and converted to an alkali hydrosulfide, thereafter oxidized with a regenerative oxidizing agent to form elemental sulfur, and finally such sulfur is collected for further use. Examples of such processes are the well-known Ferrox, Stretford and Takahax processes, each of which utilize specialized absorption solutions.

While many of the absorptive-regenerative $H_2S$ removal processes presently available are efficient in removing $H_2S$ from sour gas streams, workers in the art have found that in many instances solid sulfur tends to build up within plant equipment to an undesirable extent. For example, in some Stretford plants sulfur has been observed to preferentially deposit on the lower packing section of the absorber such as conventional glitch grid packings. In many instances the deposited samples consist of sulfur with alternate layers of gray-to-black sludge identified as vanadium scales. As can be appreciated, such sulfur depositions are extremely troublesome and can accumulate to the point where continued operation of the plant is unfeasible. When this occurs, it is generally necessary to shut down the entire plant, clean these packings by pouring cleaning solution from the top of the absorber through the bottom of the absorber. Alternatively, the packings can be removed from the absorber, cleaned and subsequently reinstalled in the absorber. Apart from the fact that this procedures are costly in and of themselves, the fact that the plant must be shut down during this cleaning period presents obvious difficulties, especially in cases where continual operation is essential. In order to obviate the latter problem, same operators have opted to construct two separate absorbers so that they can be used alternately to permit clean-up of a down absorber without the necessity of complete plant shutdown. Although this expedient ameliorates the problem of undesirable plant shutdown, it will be readily apparent that it is extremely objectionable from a cost standpoint.

It has also been known to send the untreated gas to the flare during the clean-up of the down absorber. This method is again objectionable from a cost standpoint where fuel gas is the product of the $H_2S$ removal process, since the product fuel gas is burned during the clean-up period. This method also causes undesirably the emission of large quantities of sulfur oxides from burning untreated gas and requires a variance from the local air regulation agencies. The agencies have become increasingly reluctant to issue variances.

U.S. Pat. No. 3,975,508, assigned to J. F. Pritchard and Company, proposes a method for controlling depositions of sulfur within plant equipment by adding ammonia to either the sour gas stream or directly to the absorption solution. This method is not commercially viable, since ammonia is added during the process, the amount of ammonia contained in the treated gas would exceed the level tolerated in the industry since ammonia is added during the process. Also, ammonia added to the feed gas will cause an increase in nitric and nitrous oxide emissions when combusted in standard fired equipment.

Japanese Patent Application Number J51,005,265, assigned to Nippon Steel, proposes a process for removing hydrogen sulfide from gases by conversion of hydrogen sulfide to soluble sulfur compounds using a scrubbing solution containing redox catalyst and an alkaline substance. The problem of sulfur deposit removal is not mentioned in the abstract of the document.

Japanese Patent Application Number J49,077,898, assigned to Nippon Steel, proposes a process for preparing sodium polysulfide by placing waste solution containing carbonate and sulfide with hydrogen sulfide and sodium hydroxide. The problem of sulfur deposit removal is not mentioned in the abstract of the document.

Thus, there remains a need for a commercially feasible method for removing undesirable sulfur depositions within plant equipment utilized with absorptive-regenerative $H_2S$ removal processes which completely eliminates costly shut-downs or loss of product fuel gas.

SUMMARY OF THE INVENTION

The present invention relates to a method for on-line cleaning of sulfur deposit from plant equipment utilized in absorptive-regeneration process for the removal of hydrogen sulfide from sour gas streams in which hydrogen sulfide is converted to elemental sulfur. The method involves using a caustic solution, preferably a caustic solution, from about 70° F. to about 200° F., in place of the regenerable absorption solution for a period of time sufficient to dissolve the solid sulfur deposits while simultaneously treating the gas to remove gaseous sulfur contaminants.

DESCRIPTION OF THE EMBODIMENT

Although the preferred process of the present invention is described herein in connection with the operation of a Stretford $H_2S$ absorbing system, it is to be appreciated that the methods hereof may be applied to other analogous $H_2S$ absorbing systems utilizing circulating liquid alkali absorption solution, as for example, those named above. Broadly, it can be applied to any desulfurization process where conditions exist that cause plugging of equipment with deposit that are soluble in a caustic solution in the range of 70 to 200° F.

When the stretford process is used to treat sour gas containing $H_2S$, the sour gas is placed in contact with an aqueous alkaline solution to produce an effluent gas of reduced sulfur content and to yield elemental sulfur; the solution is thereafter regenerated by placing it in contact with an oxygen-containing gas; the elemental sulfur is recovered from said solution; and the regenerated solution is recycled to the tail gas-contacting step.

A persistent problem encountered in the operation of Stretford plants has involved the undesirable precipitation and deposition of elemental sulfur on plant equipment, for example, in the column packings of absorber. The sulfur deposits plug the flow of the Stretford solution and gas. This plugging problem is illustrated by for example the significantly increased pressure drop between the bottom and the top of the packed beds in the absorber (contactor or contact zone).

Applicant has invented a method for on-line cleaning of the sulfur deposits in the plugged absorber column which involves (i) the removal of sulfur deposits from a contact zone and simultaneous, and (ii) the removal of $H_2S$ from a $H_2S$-containing gas stream. This method comprises the cleaning steps of passing a caustic cleaning solution of from about 70° F. to about 200° F., specifically from about 80° F. to about 180° F., more specifically from about 130° F. to about 160° F., still more specifically from about 142° F. to about 156° F., to said contact zone to (i) remove said sulfur deposit from said contact zone and simultaneously (ii) remove $H_2S$ from said $H_2S$-containing gas to form an effluent gas. The caustic cleaning solution contains from about 5 to about 50 wt %, specifically from about 10 to about 50 wt %, more specifically from about 12 to about 18 wt %, of a caustic chemical. Non-limiting examples of caustic chemicals suitable are NaOH, KOH, LiOH, and mixtures thereof. The caustic cleaning solution also removes $H_2S$ from the $H_2S$-containing gas. Therefore, the desulfurization process for sour gas is continuously conduct while the on-line cleaning of sulfur deposit is being performed.

In operation, the introduction of Stretford solution, e.g. to the venturi and/or from the top of the column absorber, is discontinued. In stead, a caustic cleaning solution which contains effective amount of caustics is passed to the absorber column from the top of the packed beds.

As a specific embodiment of the present invention, the valve at the bottom of the absorber for discharging spent Stretford solution is first closed to allow the caustic cleaning solution introduced to accumulate to a level such that the sulfur-plugged packings are immersed in the caustic cleaning solution. The valve is opened thereafter and the caustic cleaning solution is continuously added. The flooding of the plugged packings is maintained through out the cleaning operation.

As another specific embodiment of the present invention, the beds are not immersed with the cleaning solution and the cleaning solution just wash through the beds.

The warm caustic cleaning solution is introduced to the absorber at a rate of e.g. about 250–5000 gallons, or 500–2000 gallons per minute. The cleaning operation is continued, for example, for about 0.5 hrs to about 2 weeks, preferably from about 1 to 8 hours before normal Stretford process was resumed. The pressure drop from the bottom to the top of the packed beds will return to about e.g. less than 1 psig, preferably less than 0.5 psig, more preferable less than about 0.2 psi, which will indicate that there is no longer any substantial plugging of the packed bed exist after the on-line cleaning.

It is to be understood that for the cleaning operation the concentration of the caustics, the volume per minute of the caustic solution fed to the absorber, and the duration of the cleaning operation should vary according to the size of the absorber, the extent of the sulfur deposition, etc., and one skilled in the art will be readily able to make such adjustments.

During the cleaning process, spent caustic cleaning solution is discharged from the lower section of the column. Analytical results indicate that sulfur deposits and $H_2S$ absorbed area reacted to form soluble polysulfide $S_x^=$ (x= 2–4) and soluble thiosulfate ($S^2O^3=$). The treated gas contains less than 50 ppm, specifically less than 30 ppm, $H_2S$; and less than 5 ppm, preferably less than 2 ppm and more preferably less than 1 ppm ammonia during and after the on-line wash procedure.

As a specific embodiment of the present invention, the caustic cleaning solution further contains from about 50 to about 1000 ppm, specifically from about 100 to about 500 ppm, more specifically from about 200 to about 400 ppm of sodium sulfide or potassium sulfide. It is believed that, spiking the caustic with sodium sulfide or potassium reduces the wash duration and improves the wash effectiveness.

As a specific embodiment of the invention, the caustic cleaning solution is only introduced directly from the top of the packed beds. As another specific embodiment of the present invention, a portion of the caustic cleaning solution is premixed with the sour gas to be desulfurized before introduced to the intermediate or lower portion of the absorber, and additional cleaning solution is also introduced without being mixed with the sour gas from the top of the packed beds.

One form of the conventional Stretford process will be described to illustrate operation of a Stretford process in a normal mode when the absorber is not being cleaned. A sour gas stream containing H2S is first supplied to H2S absorber vessel via a supply line connected to an absorber intermediate the upper and lower ends thereof. The absorber vessel is preferably divided into an upper absorption zone communicating directly a lower zone therebelow. The upper section conventionally houses packing which can comprise any one of a number of readily available expedients for increasing the gas-liquid contact between a sour gas stream and a liquid absorption solution.

A typical Stretford solution is delivered to the absorber for countercurrent contact with the sour gas stream. In this regard, such a Stretford solution may comprise, for example, 20 to 30 grams per liter of sodium carbonate (soda ash), 1 to 5 grams per liter of anthraquinone disulfonic acid, and 1 to 3 grams per liter of vanadium as sodium meta vanadate. The above chemicals, along with suitable sequestering agents, are dissolved in water to make up the preferred H2S absorption solution.

In the Stretford process, H2S from the sour gas stream initially reacts with the alkaline soda ash within the absorber to yield hydrosulfide (HS⁻) according to the following generalized formula:

Sodium meta vanadate also reacts with HS⁻ in absorber and is reduced from 5 valent to 4 valent to effect precipitation of sulfur:

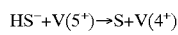

Simultaneously, the anthraquinone disulfonic acid reacts with 4 valent vanadium to convert it back to 5 valent, with consequent reduction of ADA:

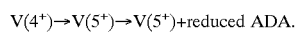

The subject Stretford solution, after absorbing H2S from the gas admitted to the vessel according to the above equation, is retained in the absorber vessel for a period of about 10 minutes to allow for complete precipitation of sulfur, while clean gas substantially free of H2S is discharged from the top of the vessel. The underflow from the absorber vessel is thereafter directed to the oxidizer where the used absorption composition is turbulently mixed with air to restore the chemical constituents in the Stretford solution to their original, active state in accordance with the reaction:

Reduced ADA+O$_2$→ADA+H$_2$O

Thus, the overall Stretford reaction in simplified form is:

2H$_2$S+O$_2$⇌2H$_2$O+2S.

Finely divided sulfur within oxidizer is forced to the top of the liquid by the turbulently mixed air where it is gathered in an overflow forth containing from 5 to 10 percent (usually 6 to 8 percent) sulfur. This forth is delivered to a filter feed tank where the sulfur sludge is accumulated. At this point the underflow sulfur is fed to a rotary vacuum filter whereupon a filter cake is formed and any excess absorption solution is fed to the absorber pump tank. In addition, the underflow regenerated Stretford solution from the oxidizer is fed to the absorber pump tank.

The sulfur cake from the filter is next fed to an autoclave where heat is applied to melt the sulfur. The sulfur-water mixture so formed is then fed with steam to an autoclave separator, where the sulfur-water mixture is separated and liquid sulfur of greater than 99 percent purity and commercial acceptability is drawn off. The overflow from the autoclave separator which contains water and Stretford absorption solution is directed such that the water is returned to the autoclave feed tank and the regenerated Stretford solution is returned to the absorber pump tank. The collected absorption solution within the autoclave feed tank is then recirculated to the top of the absorber vessel for reuse therein.

The invention will be illustrated by the following illustrative embodiments which are provided for illustration purpose only and are not intended to limit the scope of the instant invention.

BRIEF DESCRIPTION OF THE DRAWING

FIG. 1 is a schematic drawing of a Stretford type of absorber column having two venturi connected thereto. The introduction of the Stretford solution is discontinued. The caustic cleaning solution is passed from the top of the packed beds to clean the packings with sulfur deposits and simultaneously continue with the H$_2$S removal operation.

ILLUSTRATIVE EMBODIMENT

Referring now to the drawing FIG. 1, a Stretford process desulfurization plant having an absorber column (contact zone) of 24 ft. in diameter and 70 ft. in height from tangent to tangent was utilized. The absorber column has a glitch grid packing 3 of about 10 ft. below the pall rings packing 4 which is also about 10 ft. in height.

A sour gas stream which is a low BTU flexigas stream containing about 21–26 wt % of CO, about 5–8 wt % of CO$_2$, about 45–55 wt % N$_2$, about 14–18 wt % H$_2$, about 1–3 wt % methane, and approximately 1000–4000 ppm H$_2$S produced from partial burning of fluid coke is introduced through the venturi 4 to the absorber column.

In a normal Stretford Desulfurization Process operation, a Stretford solution is introduced to the venturi 4 and mixed with the sour gas to form a mixture. About 75–95 wt %, specifically about 85–95 wt %, of the H$_2$S contained in said sour gas is absorbed by the Stretford solution in the venturi. The mixture is passed to the absorber column wherein Stretford solution containing absorbed hydrogen sulfide flows downward, and the partially treated sour gas containing about 100–400 ppm of H$_2$S travels upwardly. Additional Stretford solution is introduced to the absorber column from the top of the pall rings packing downflowing through the packed beds, the gas flows upwardly through packed bed countercurrent to and in intimate contact with the downflowing Stretford solution, whereby additional H$_2$S is absorbed to form a treated gas containing less than 50 ppm, preferably less than 30 ppm, of H$_2$S which exits the column from the top.

The Stretford solution used contains the following ingredients and approximate concentrations:

2 g/L vanadium (added as sodium vanadate)
2 g/L anthraquinone disulfonate (ADA)
25–30 g/L total alkalinity (Na$_2$CO$_3$+NaHCO$_3$)
90 g/L sodium thiocyanate
50 g/L sulfate
70 g/L total sodium content
pH approximately 8.5–9.5

Before a spent Stretford solution is recycled back to the venturi or absorber column to be reused, necessary adjustment, such as dilution, addition of chemicals, etc., may be made to stay within the above formulation.

As alluded to above, a persistent problem encountered in the operation of Stretford plants has involved the undesirable precipitation and deposition of elemental sulfur on plant equipment, for example, in the column packings of absorber 1, especially the lower (glitch grid) packing section 3. The sulfur deposits plug the flow of the Stretford solution and gas. This plugging problem is illustrated by, as for example, about 2–3 psig pressure drop between the bottom and the top of the packed beds. This pressure drop is significantly higher than the pressure drop observed in a normal operation with an unplugged absorber column, in which the pressure below the bed is e.g. 20 psig and that above the bed is about e.g. 19.8 psig with only about 0.2 psig pressure drop.

An on-line cleaning of the plugged absorber column was conducted. First, the introduction of Stretford solution, both to the venturi 4 and from the top of the column absorber, was discontinued. In stead, a caustic cleaning solution which contains 20 Baume (15 wt %) NaOH is passed to the absorber column from the top of the packed bed (Pall rings packings). The valve at the bottom of the column for discharging spent Stretford solution was first closed to allow the caustic cleaning solution introduced to accumulate to a level that the sulfur-plugged packings are immersed in the caustic cleaning solution. The valve is opened thereafter and the caustic cleaning solution was continuously added at the rate of e.g. 500–2000 gallons per minute. The flooding of the plugged packings was maintained through out the cleaning operation. The cleaning operation was continued for about 1 to 8 hours before normal Stretford process was resumed. The pressure drop from the bottom to the top of the packed beds returned to about 0.2 psig which indicated that there was no longer any substantial plugging of the packed bed existed after the on-line cleaning.

During the cleaning process, spent caustic cleaning solution was discharged from the lower section of the column. Analytical results indicated sulfur deposits and H$_2$S absorbed were reacted to form soluble polysulfide S$_x$=(x= 2–4) and soluble thiosulfate (S$^2$O$^3$=). The treated gas contains less than 50 ppm, specifically less than 30 ppm, H$_2$S; and less than 1 ppm ammonia during and after the on-line wash procedure.

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A method for on-line cleaning of sulfur deposits from a contact zone which involves (i) removal of sulfur deposits from a contact zone and simultaneous (ii) removal of $H_2S$ from a $H_2S$-containing gas stream in a process for removing $H_2S$ from a $H_2S$-containing gas stream to produce an effluent gas of reduced sulfur content and to yield elemental sulfur in which process said gas is placed in a contact zone in contact with an aqueous alkaline washing solution comprising a water-soluble metal vanadate to yield a first effluent gas of reduced sulfur content, the solution is thereafter regenerated by placing it in contact with an oxygen-containing gas, elemental sulfur is recovered from said solution, and said regenerated solution is recycled to said gas-contacting step, and there are sulfur deposits collected in said contact zone which impede liquid and gas flow therethrough, which method comprising the cleaning steps of:

discontinuing placing said $H_2S$-containing gas in contact with said aqueous alkaline washing solution comprising a water soluble vanadate passing a caustic cleaning solution of from about 70 F. to about 200 F. to said contact zone to (i) remove said sulfur deposit from said contact zone and simultaneously (ii) remove $H_2S$ from said $H_2S$-containing gas to form a second effluent gas, wherein said caustic cleaning solution comprises from about 5 to about 50 wt % of a caustic chemical selected from the group consisting of NaOH, KOH, LiOH, and mixtures thereof, wherein the caustic cleaning solution also removes $H_2S$ from the $H_2S$-containing gas.

2. The method as described in claim 1, wherein said caustic cleaning solution comprises from about 10 to about 30 wt % of a caustic chemical selected from the group consisting of NaOH, KOH, LiOH, and mixtures thereof.

3. The method as described in claim 1, wherein said caustic cleaning solution comprises from about 12 to about 18 wt % of a caustic chemical selected from the group consisting of NaOH, KOH, LiOH, and mixtures thereof.

4. The method as described in claim 2, wherein the temperature of said caustic cleaning solution is from about 80° F. to about 180° F.

5. The method as described in claim 2, wherein the temperature of said caustic cleaning solution is from about 130° F. to about 160° F.

6. The method as described in claim 2, wherein the temperature of said caustic cleaning solution is from about 142° F. to about 156° F.

7. The method as described in claim 2, wherein said caustic cleaning solution is introduced to the contact zone from the top of the contact zone.

8. The method as described in claim 2, wherein said contact zone comprises an absorber column comprises a glitch grid packed bed and a pall rings packed bed above the grid packed bed.

9. The method as described in claim 2, wherein during said cleaning steps, substantially all of the section of the contact zone containing sulfur deposits is immersed in the caustic cleaning solution.

10. The method as described in claim 2, wherein said caustic cleaning solution further comprises adding from about 50 to about 1000 ppm of sodium sulfide or potassium sulfide.

11. The method as described in claim 2, wherein said caustic cleaning solution further comprises adding from about 100 to about 500 ppm of sodium sulfide.

12. The method as described in claim 2, wherein during said cleaning steps, said second effluent gas contains less than 50 ppm of $H_2S$ and less than 2 ppm of ammonia.

13. The method as described in claim 2, wherein spent caustic cleaning solution comprising polysulfide and thiosulfide formed from reacting sulfur deposits from said contact zone and $H_2S$ removed from said $H_2S$-containing gas is discharged from the contact zone.

14. A method for on-line cleaning of sulfur deposits from a contact zone which involves (i) removal of sulfur deposits from a contact zone and simultaneous (ii) removal of $H_2S$ from a $H_2S$-containing gas stream in a process for removing $H_2S$ from a $H_2S$-containing gas stream to produce an effluent gas of reduced sulfur content and to yield elemental sulfur in which process said gas is contacted in a contact zone with an aqueous alkaline washing solution comprising a water-soluble metal vanadate to yield a first effluent gas of reduced sulfur content, the solution is thereafter regenerated by contact with an oxygen-containing gas, elemental sulfur is recovered from said solution, and said regenerated solution is recycled to said gas-contacting step, and there are sulfur deposits collected in said contact zone which impede liquid and gas flow therethrough, which method comprising the cleaning steps of:

passing a caustic cleaning solution of from about 130° F. to about 160° F. to said contact zone to (i) remove said sulfur deposit from said contact zone and simultaneously (ii) remove $H_2S$ from said $H_2S$-containing gas to form a second effluent gas, wherein said caustic cleaning solution comprises from about 10 to about 20 wt % of a caustic chemical selected from the group consisting of NaOH, KOH, LiOH, and mixtures thereof, wherein the caustic cleaning solution also removes $H_2S$ from the $H_2S$-containing gas; wherein said caustic cleaning solution is introduced to the contact zone from the top of the contact zone; wherein during said cleaning steps, substantially no aqueous alkaline washing solution comprising a water-soluble metal vanadate is introduced to the contact zone and the $H_2S$-containing gas is introduced to the contact zone without mixing with said aqueous alkaline washing solution comprising a water-soluble metal vanadate; wherein during said cleaning steps, substantially all of the section of the contact zone containing sulfur deposits is immersed in the caustic cleaning solution; wherein during said cleaning steps, said second effluent gas contains less than 50 ppm of $H_2S$ and less than 2 ppm of ammonia; wherein spent caustic cleaning solution comprising polysulfide and thiosulfide formed from reacting sulfur deposits from said contact zone and $H_2S$ removed from said $H_2S$-containing gas is discharged from the contact zone.

* * * * *